United States Patent [19]

Weber

[11] Patent Number: 5,075,182
[45] Date of Patent: Dec. 24, 1991

[54] BATTERY HOLDER BATTERY HANDLE AND BATTERY INDICATOR

[76] Inventor: Eugene W. Weber, 334 Avila Rd., San Mateo, Calif. 94402

[21] Appl. No.: 515,825

[22] Filed: Apr. 27, 1990

[51] Int. Cl.$^5$ .............................................. H01M 2/00
[52] U.S. Cl. ........................................ 429/1; 429/90; 429/96; 429/122; 429/187
[58] Field of Search ......................... 429/1, 9, 96–100, 429/187, 90, 122; 364/708; 361/392

[56] References Cited

U.S. PATENT DOCUMENTS

| | | | |
|---|---|---|---|
| 3,936,121 | 2/1976 | Leinberger | 429/1 |
| 4,085,253 | 4/1978 | Johnson | 429/1 |
| 4,291,106 | 9/1981 | Hooke | 429/1 |
| 4,634,642 | 1/1987 | Doriga | 429/187 X |
| 4,690,878 | 9/1987 | Nakamura | 429/1 |
| 4,752,539 | 6/1988 | Vatter | 429/1 |
| 4,756,978 | 7/1988 | Nitcher et al. | 439/1 |
| 4,828,944 | 5/1989 | Yabe et al. | 429/97 |
| 4,840,583 | 6/1989 | Moore | 439/504 |
| 4,868,074 | 9/1989 | Omori et al. | 429/98 |
| 4,913,981 | 4/1990 | Hynes et al. | 429/1 |

Primary Examiner—Anthony Skapars

[57] ABSTRACT

The present invention relates to a flat battery containing device for an electronic apparatus. The device includes a battery holder, a battery handle and an optional battery indicator. The battery handle, attached to the battery, is used to simplify and tactilely aid the installation of the battery and it preferably has a keying feature that assures the proper battery is correctly installed in the battery holder. The optional battery indicator provides a means of visually verifying that a working battery is properly inserted into the battery holder and that the battery holder is properly connected to the electrical apparatus.

13 Claims, 3 Drawing Sheets

BATTERY HOLDER BATTERY HANDLE AND BATTERY INDICATOR

BACKGROUND

1. Field of Invention

This invention relates to battery holders and battery handles. The battery handles are such that they are attached to the battery and in addition to being used for installing the battery into the holder the battery handle preferably is used to "key" the battery properly into the holder to prevent the installer from inserting the battery incorrectly. The batteries of concern in this invention are of a flat configuration, i.e. their length and width are considerably greater than their thickness.

The battery indicator of this invention relates to a means of visually verifying that the battery is properly installed in its holder and that the battery is properly connected into the circuit that it is intended to power.

The intended application for this invention is in electronic equipment. Of particular interest is an application to personal computers.

2. Description of Prior Art

Many personal computers in use today accept and log data against a time base measured by their real time clocks. These clocks are powered by normal AC power systems when the computers are being used, but require a battery to maintain key time and memory functions, such as tracking internal memory and system configuration information, when the computer is turned off.

The battery typically used for this backup function has been a nominal 6 volt lithium battery. The chemistries which have been used are lithium thionyl chloride, lithium carbon monofluoride and lithium manganese dioxide. These have resulted in a service life of approximately 3 years. The majority of these batteries are attached to an inside surface of the computer, usually with Velcro, some are clipped into specially designed holders, and a few are soldered directly onto the motherboard. The batteries attached to an inside surface with Velcro are connected electrically to the motherboard of the computer via lead wires and a connector.

With these typical installations, in order to replace a depleted battery the computer case must be opened. The old battery can then be unplugged and removed. After the new battery is installed the time and configuration information must be reprogrammed into the computer if the computer has been left, with the AC power turned off, for more than about 15 minutes without a working battery.

Battery holders, battery handles and battery connection indicators have been provided for various types of batteries. In some instances the holder has been a thin battery-containing structure for an electronic apparatus which includes a lock pin provided on a flexible arm, as shown in U.S. Pat. No. 4,828,944. This type of holder is intended to simplify the handling of button-type batteries with the holder being designed to prevent unintentional removal of the holder itself. In U.S. Pat. No. 4,752,539 there is described a battery receptacle to be used in combination with a receiver for a laser transmitter. That battery holder was intended to eliminate the problems of loose wires and loose doors of other battery holder types.

Further, U.S. Pat. No. 4,756,978 describes a battery and mount combination comprising a battery having a case that has an underside to which a pair of battery terminals are mounted. This structure was developed to ease in the handling and installation of larger automotive type batteries.

Additionally, indicators have been provided on jumper cables for indication of correct polarity by the illumination of included LED elements upon inappropriate polarity connection between associated batteries. Such an indicator is disclosed in U.S. Pat. No. 4,840,583.

Thin, flat batteries, generally envelope-shaped, were developed by Polaroid Corporation to form a part of film packs for Polaroid instant cameras. Similarly shaped lithium batteries have been produced for general purposes by Gould, Inc. Eastlake, Ohio, under the trademark Powerdex. Such batteries generally have a flexible outer casing or cover which is edge sealed. They are advertised and designated by Powerdex (Gould, Inc. Materials and Components Business Section), and generally known, as ultra-thin, planar geometry type batteries.

Further, slot structures for receiving these thin, cardlike lithium batteries have been available and were produced for Polaroid and Gould, Inc by Powercard Corp. of Waltham, Mass. The slot structures have included a pair of internal terminals for engagement against positive and negative contacts positioned on one side of the thin battery.

SUMMARY OF THE INVENTION

An object of the present invention is to provide an easily replaceable battery, with appropriate holder, that can be installed on an electronic apparatus such as a personal computer. The device of the invention enables a user to replace the battery of such an apparatus externally, without having to open the case of the apparatus. The battery preferably has a handle that aids in the installation of the battery into the holder and assures that the battery is correctly installed, i.e., that the battery terminals are correctly connected plus to plus and minus to minus.

An object of the battery holder is to provide an easy to install holder that will fit into existing electronic apparatus in use in the field as well as to newly manufactured ones. For this capability the holder preferably must fit into existing standard openings in the apparatus's case. With regard to personal computers most cases offer four to ten "expansion slots" in the rear of the case. These slots can be utilized to add additional input/output ports to the computer or to add additional function boards to the machine itself. One object of this invention is to utilize one of these standard expansion slots as a mounting and attachment for the battery holder for use in a personal computer.

However, it should be noted that on newly manufactured apparatus (including computers) this battery holder could be installed in a different, custom made slot or opening made specifically of the battery holder.

Another object of the present invention is to provide a diagnostic device for the apparatus which will indicate to the user:

a) that the battery is good, and/or b) that the battery is properly inserted in the holder, and/or c) that the battery is properly connected electrically to the apparatus's circuit.

This diagnostic indicator can in some cases be used to trouble shoot a disfunctioning computer or other electronic apparatus. Typically if the apparatus's time clock is not working it is because the battery is defective, or because the battery is not properly installed in its holder, or because the holder is not properly connected inside the apparatus, or because there is some hardware failure inside the apparatus. This visual diagnostic will tell the user visually if the problem lies in the battery; wherein a simple fix would be to replace the battery or if it lies in the hardware itself, in which case the apparatus would need to be taken in for repair or a service person called. This diagnostic can be done without opening the computer case and can be done on the request of a service technician directing the user via a phone call.

Additional embodiments can include a method of coding the battery handle and holder to ensure that a battery of a specific voltage will be installed. For example, a 3.6 volt battery holder could be red with keyed notches that would only accept a red handled properly keyed battery with handle. Similarly, a 6 volt battery holder could be black with notches that are keyed only to accept a black handled 6 volt battery.

Further, the battery contacts of the respective batteries for different apparatus can be arranged in different positions, further ensuring that only the proper battery will be inserted effectively to power the apparatus.

These together with other objects and advantages which will become subsequently apparent reside in the construction and operation as are fully hereinafter described and claimed, reference being made to the accompanying drawings a part hereof, wherein like numerals refer to like parts throughout.

DESCRIPTION OF PREFERRED EMBODIMENTS

Figure 1:
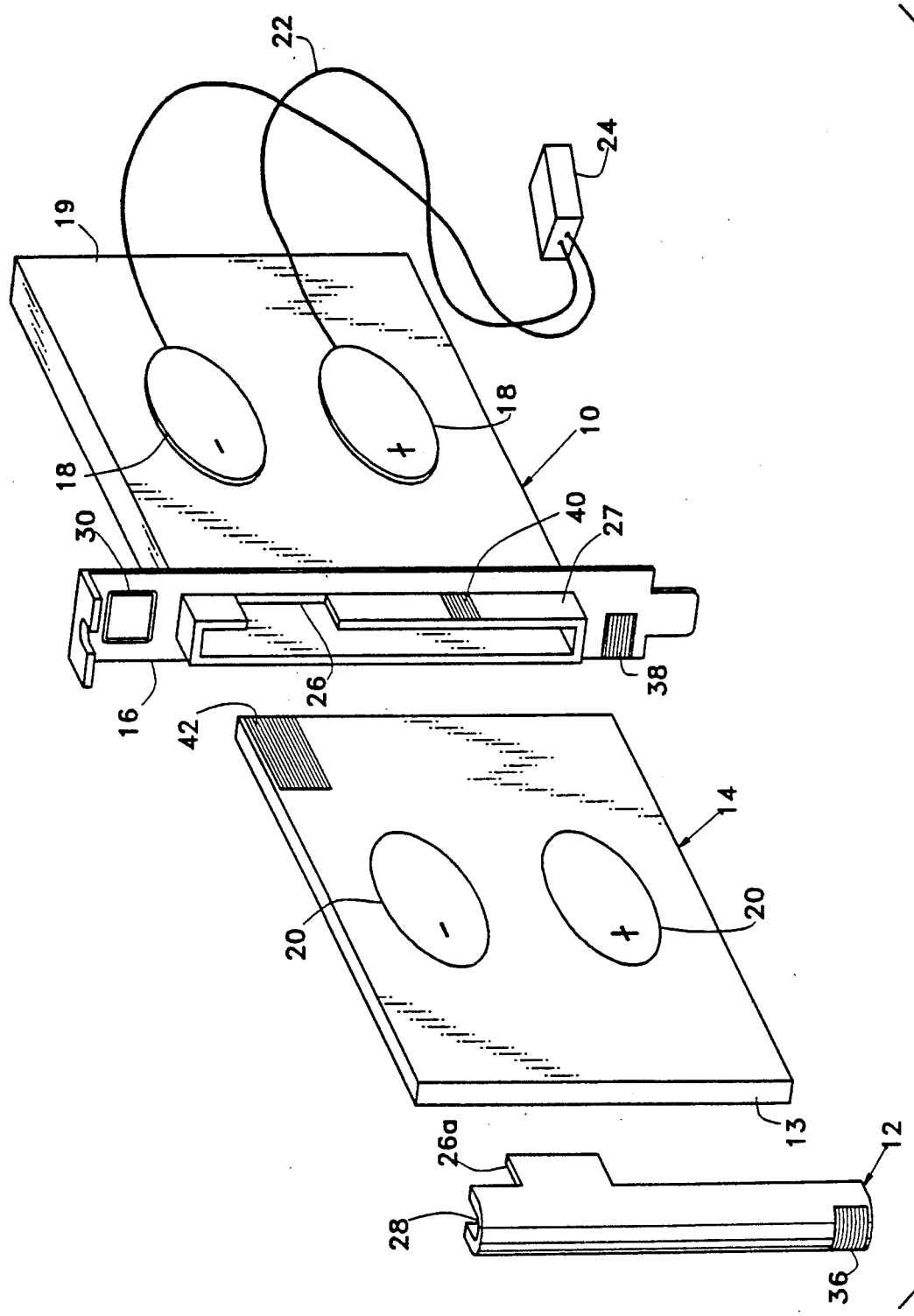
FIG. 1 is a perspective exploded view of a battery holder, battery and battery handle in accordance with the principles of the invention.

In the drawings the battery holder and handle of the present invention are generally designated by reference numerals 10 and 12 respectively.

A battery to be used in combination with the battery holder and handle is designated by reference numeral 14. The replacement battery is provided with the handle 12 permanently affixed to a front edge 13 of the battery 14.

The battery holder 10, in the preferred usage, is made in combination with a standard mounting bracket 16 which is designed to fit the particular computer or electronic apparatus into which the battery holder is to be installed. The battery holder is fitted with electrical contacts indicated at 18. On the inside of a casing 19 of the holder, these contacts 18 make contact with the battery terminals 20 when the battery 14 is inserted. The electrical contacts are connected to lead wires 22, which are terminated at a connector 24 sized to mate conductively with the electrical apparatus. The outer sides of the contacts 18 on the exterior of the casing preferably are appropriately insulated.

Figure 3:
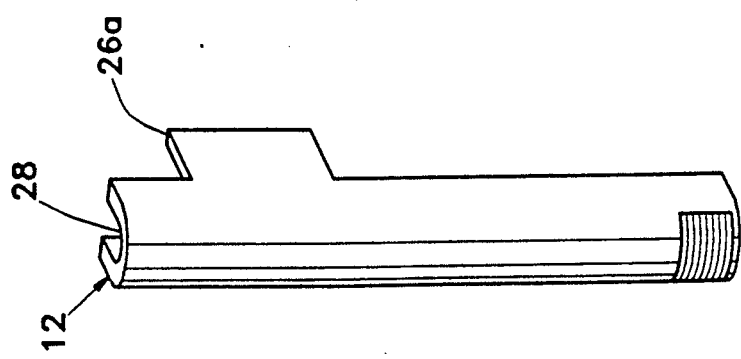
FIG. 3 is a perspective view of the battery handle.

The battery holder 10 preferably has a "keying" feature that allows the battery handle 12 and the battery 14 to fit into place in only one, electrically correct, way. This feature may take the form of a notch 26 in a collar 27 forming a part of an insertion slot for receiving the battery 14 in the holder 10. As indicated in FIGS. 1 and 3, the notch 26 may cooperate with a complementarily shaped tab or protrusion 26a on the battery handle 12. The "keying" feature can be oriented differently for different voltage batteries so that only the correct battery can be installed in the holder chosen for the particular apparatus (also the battery cannot be installed upside down). For example, if an apparatus requires a 6 volt battery and a holder that is keyed to accept a 6 volt battery is installed in the apparatus, then only a 6 volt battery with a 6 volt keyed handle will fit. Otherwise, the tab and notch will not match in position and the user will not be able to push the battery to the seated position.

In one preferred construction the battery handle 12 has a slot 28, into which the battery is inserted. The battery is secured to the handle with either an interference or press fit or it can be secured with an adhesive. Any appropriate secure connection may be used, so long as it does not interfere with the internal battery chemistry.

An additional embodiment or feature of the battery holder 10 is that it can contain an indicator 30. The optional indicator provides visual verification that a working battery is correctly installed into a properly connected battery holder. The indicator may comprise an ultra low power liquid crystal display type device. Preferably the indicator includes an LCD device which draws less than a microampere of current at lower voltages (in the range of 3 to 10 volts) as compared to most LCDs which generally draw current in the range of milliamperes. Preferably, the indicator 30 uses an LCD device generally of the type produced by Displaytech, Inc., in Boulder, Colo. The indicator 30 will be white (or black) only if power is appropriately connected from the battery 14 to the contacts 18 of the holder, and the circuit can be structured so that current must actually be flowing into the apparatus (e.g. the computer) in order to produce this "okay" signal at the indicator. If power is not properly connected, or is not properly flowing into the apparatus, the indicator 30 will display the opposite signal of black (or white).

It should be understood that the indicator 30, as well as its specific construction, is a desirable but optional feature of the invention.

Another feature which may be included in preferred embodiments of the invention is a color coding feature which is again designed to ensure that the user purchases and inserts the proper replacement battery in the slot. FIG. 1 indicates this use of color coding only schematically. In FIG. 1 a patch 36 of a certain color is shown on the handle 12. For example, the patch of color may be blue as indicated. In actual practice the color may cover the entire handle 12.

A similar color or patch of color 38, 40 is used on the battery holding device 10. For example, a patch 40 can be included on the collar 27, and/or a patch 38 can be placed on the face of the mounting bracket 16, both as illustrated in FIG. 1. Larger areas can be covered with the designated color if desired.

Similarly, a patch 42 of the same color may be included on the side of the battery 14 itself, for further reference by the user in selecting a replacement battery.

Further, another optional feature of the invention can be the arrangement of the battery contacts 20 and 18 in different orientations and relative positions, "keyed" to the voltage and type of battery designed for the particular receptacle or holder 10. One typical position is indicated generally in FIG. 1. This could be for, for example, a six volt battery. A three volt or nine volt battery, on the other hand, might have the battery terminal contacts 20 farther toward the back of the battery, or staggered oppositely to what is shown in FIG. 1. The casing contacts 18 would then be similarly placed, with the entire range of available batteries and receptacles being such that it would be impossible to insert and electrically connect the wrong battery into any particular holder. This latter feature can also provide a measure of quality control for the device. The manufacturer of the holder 10 with the casing 19 can place the contacts 18 in a distinctive location which is different from the contact positions for general purpose flat batteries. Thus, only the manufacturer's particularly designated batteries will be insert-able for proper electrical connection in the battery holder.

Figure 4:
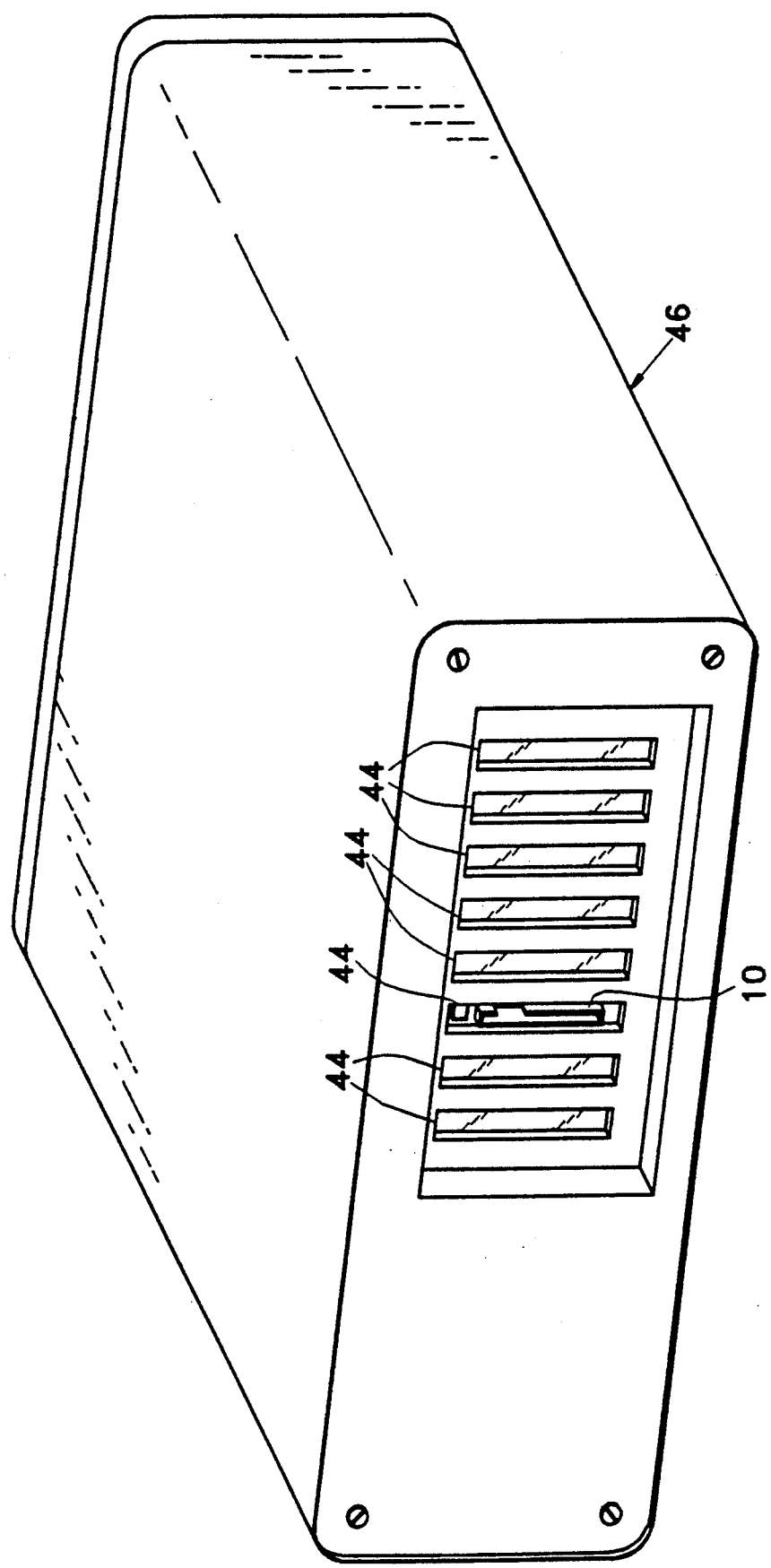
FIG. 4 is a perspective view showing rear expansion slots of a computer as an example of the application of the invention, with the battery holder installed in one of the slots.

FIG. 4 schematically shows a portion of the rear of a typical computer case. Generally a conventional computer has about eight expansion slots 44; six are shown in FIG. 4.

Figure 2:
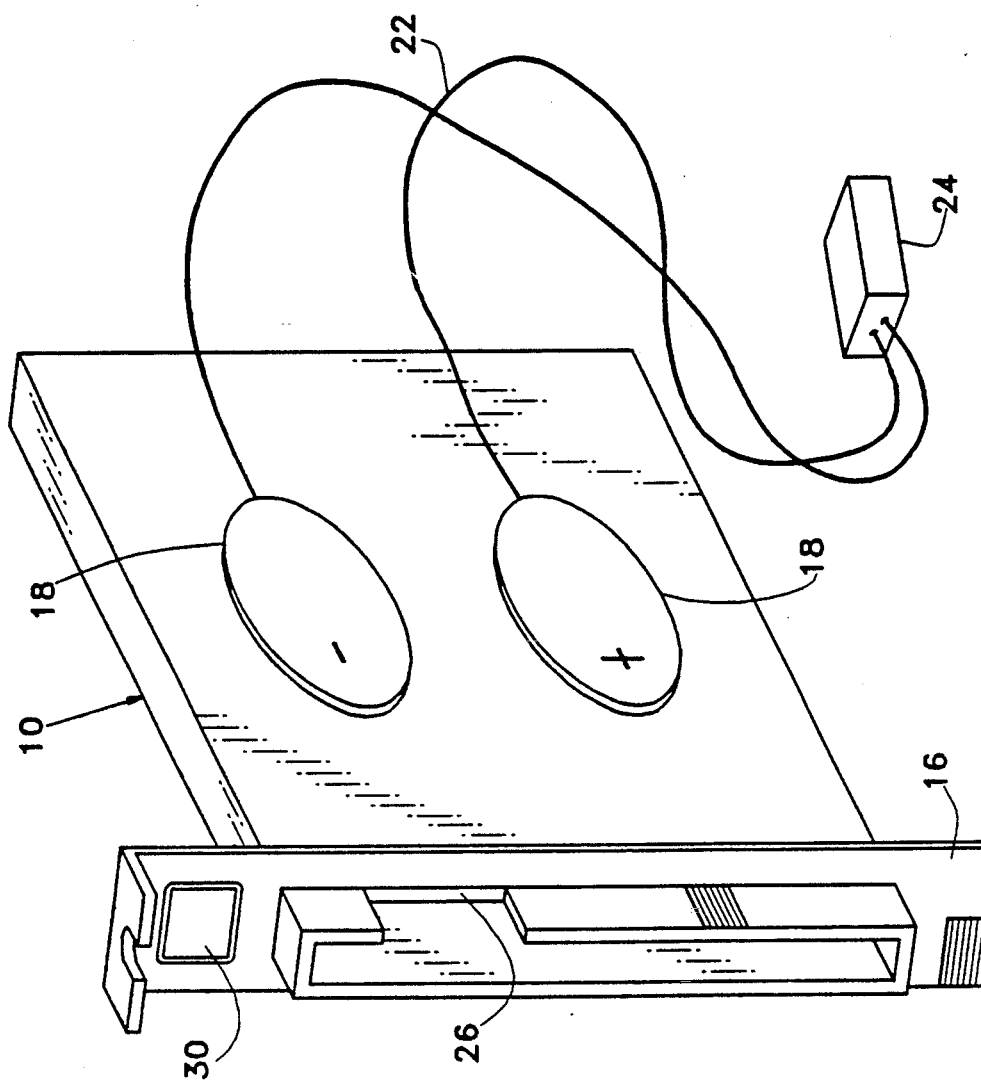
FIG. 2 is a perspective view of the battery holder.

FIG. 4 indicates schematically that a battery receiving holder device 10 has been installed in one of the slots 44 at the back of a computer 46. Since the exemplary bracket configuration 16 shown in FIGS. 1 and 2 is similar in shape and function to input/output port devices which are somewhat standardized for computer expansion slots, the bracket 16 will attach directly into the expansion slot 44 in the same manner as an input/output port device. For most IBM AT type computers the bracket attaches with a single screw. For Apple type computers the bracket slips or snaps into position. Either of these methods, or other device compatible methods could be used with this invention.

Only on initial installation of the battery receiving holder 10 into an existing computer will the computer case 46 need to be opened. At that time the bracket 16 is installed, and the electrical connector device 24 is plugged into the appropriate place, replacing the connection of the previous battery.

For example, the expansion slots 44 may typically be about ½ inches by 3 to 4 inches. The battery holder device 10 may have a front bracket 16 Which is about 4 to 5 inches tall, for fitting into the standard computer slot as described above. The actual battery 14, in the thin, flat, envelope-like form as described, may be about 3 inches tall and about 3¾ inches in length, although other dimensions, if they become relatively standardized, can be used. The thickness of the battery is only about ⅛ inch, and in any event less than about ¼ inch. Thus, the depth of the receptacle for the flat battery, as defined by the collar 27 and the interior of the preferably plastic casing 19 of the holder, should be approximately ¼ inch for receiving the flat battery relatively closely.

In typical use in a personal computer for clock functions, a flat battery 14 such as contemplated for use in the present invention will last about two years or longer. In the preferred embodiment of the invention, when the battery is so low as to require replacement (which can be prior to the battery's going completely "dead"), the user may simply slide the flat battery out of the holder 10 by pulling on the handle 12, while the computer is connected to AC power and running. The user then slides in a replacement battery which has already been purchased in accordance with specifications, and the battery replacement is completed.

Alternatively, the user can routinely change the battery every two years, even in the absence of any low battery indication, as preventive maintenance.

In a slightly modified embodiment not specifically shown in the drawings, the indicator 30 which may be included on the battery holder device can be powered only when the computer is powered and running, thus drawing power only from wall current. In this embodiment sensors can be included (not shown) to check the remaining power of the battery periodically (such as every time the computer is turned on) and to indicate via the indicator 30 when the battery's reserve power has reached a critically low level. Then, a light emitting diode or buzzer or beeper can be used as the indicator 30, to provide a brighter or audible signal indicating to the user that it is time to replace the battery. Of course, the LED signal or audible signal would only be present when the computer is powered and running, if the battery itself is not relied upon for powering the signal.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalent may be resorted to, falling within the scope of the invention.

What is claimed as new is as follows:

1. An electrical apparatus having electrical components at least some of which are capable of being powered by a battery, and the apparatus having an externally replaceable battery, comprising:

a housing of the electrical apparatus, a battery holder secured to the housing of the apparatus, the battery holder being relatively flat and having much greater length and depth than its thickness and having a battery receptacle slot with an external opening which is generally at the exterior of the housing of the apparatus, the battery holder having a pair of internal electrical contacts extending to a position within the battery receptacle slot such that they will engage power contacts of a selected battery when inserted, and including connection means extending from the electrical contacts to a position of connection with electrical components of the apparatus, a very flat, thin battery of the ultra-thin, edge sealed, planar geometry type having length and depth dimensions far greater than its thickness and being generally rectangular and shaped and sized so as to fit relatively closely in the battery receptacle slot of the battery holder with an edge of the battery extending substantially to said external opening, and with power contacts of the battery positioned to engage the internal electrical contacts of the battery holder when the battery is fully inserted in the battery receptacle slot, and means for keying the battery to the battery holder for the particular electrical apparatus within which the battery holder is incorporated, to help assure that only the proper battery will be installed for the particular electrical apparatus, to the exclusion of other batteries which may be of different specifications.

2. The invention defined in claim 1, wherein the means for keying includes a means for preventing any but the proper battery from engaging the electrical contacts of the battery holder even if the battery physically fits into the receptacle slot.

3. The invention defined in claim 1, wherein the opening of the battery receptacle slot is exposed to the exterior of the electrical apparatus, so that battery replacement can be accomplished directly from the exterior of the apparatus.

4. The invention defined in claim 1, wherein the battery holder is incorporated within the housing of the electrical apparatus, with only an end of the battery holder including the battery receptacle slot entry being accessible from outside the apparatus.

5. The invention defined in claim 1, wherein the means for keying the battery to the battery holder includes a specific, dedicated and preselected positioning of the battery power contacts and a similar positioning of the internal electrical contacts of the battery holder, so that any battery not having contacts in the preselected position will not engage both electrical contacts.

6. The invention defined in claim 1, further including a handle fixed to an outer or front end of the battery, and wherein said means for keying the battery includes locating means on the handle and on an outer face of the battery holder for receiving only a battery having a proper handle keyed to the battery holder.

7. The invention defined in claim 6, wherein the locating means includes a tab or protrusion on one side of the handle, at a specific and unique location, and a corresponding recess on the face of the battery holder for receiving the tab or protrusion, with the orientation of the tab or protrusion and the recess being oriented to preclude an upside down insertion or the insertion of any other battery having a differently configured handle.

8. The invention defined in claim 1, wherein the electrical apparatus comprises a computer, with the connection means of the battery holder being connected to clock functions of the computer which operate when the computer is switched off from AC power.

9. The invention defined in claim 8, wherein the battery holder is assembled into an expansion slot at the rear of a housing of the computer.

10. The invention defined in claim 1, wherein the means for keying includes color keying means between the battery holder and the battery designated to be received in the holder, comprising a readily visible color on an external face of the battery holder, and a corresponding color on the designated battery.

11. The invention defined in claim 1, wherein the means for keying includes color keying means between the battery holder and the battery designated to be received in the holder, comprising a readily visible color on an external face of the battery holder, and the battery further including a handle affixed to a front or outer end of the battery and having a similar color readily visible on the handle.

12. The invention defined in claim 1, further including a visible status indicator at an external position on the battery holder, with means for activating the visible status indicator to, a changed status-indicating condition when the battery contained in the battery holder is not connected to provide sufficient power to the electrical apparatus.

13. The invention defined in claim 1, further including a status indicator at an external position on the battery holder, with means for activating the status indicator to a changed status-indicating condition when the battery contained in the battery holder is not connected to provide sufficient power to the electrical apparatus.

* * * * *